(12) United States Patent
Murozumi

(10) Patent No.: US 6,594,543 B2
(45) Date of Patent: Jul. 15, 2003

(54) METHOD OF DISPLAYING SHAPES OF MATERIAL/PRODUCT IN MACHINING SIMULATION

(75) Inventor: Masanori Murozumi, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 277 days.

(21) Appl. No.: 09/740,999

(22) Filed: Dec. 21, 2000

(65) Prior Publication Data

US 2001/0008982 A1 Jul. 19, 2001

(30) Foreign Application Priority Data

Jan. 13, 2000 (JP) ........................................ 2000-009986

(51) Int. Cl.⁷ .............................................. G06F 15/46
(52) U.S. Cl. ........................ 700/184; 700/180; 700/186
(58) Field of Search ........................ 700/173, 176–180, 700/159, 182, 184, 187

(56) References Cited

U.S. PATENT DOCUMENTS

| | | | | |
|---|---|---|---|---|
| 4,833,617 A | * | 5/1989 | Wang | 700/173 |
| 5,400,260 A | * | 3/1995 | Matsumura et al. | 700/180 |
| 5,416,715 A | * | 5/1995 | Kinoshita et al. | 700/178 |
| 5,471,394 A | * | 11/1995 | Matsumura et al. | 700/184 |
| 6,438,445 B1 | * | 8/2002 | Yoshida et al. | 700/173 |

FOREIGN PATENT DOCUMENTS

| | | |
|---|---|---|
| EP | 0 592 687 | 4/1994 |
| GB | 2 140 937 | 12/1984 |

OTHER PUBLICATIONS

Patent Abstract of Japan No. 01–2966310, dated Nov. 29, 1989.
Patent Abstract of Japan No. 06–102920, dated Apr. 15, 1994.

* cited by examiner

*Primary Examiner*—Leo Picard
*Assistant Examiner*—Douglas S. Lee
(74) *Attorney, Agent, or Firm*—Armstrong, Westerman & Hattori LLP

(57) ABSTRACT

The invention relates to a method of displaying a shape of a material and a shape of a product for a speedy machining simulation. In the machining simulation wherein the shape of the material, the shape of the product, and a shape of a tool are displayed as images on a display unit, and portions of the image of the material and the image of the product overlapping the image of the tool are successively eliminated, the shape of the product in accordance with a portion to be machined is displayed as a line image indicating only an outline of the product, on the other hand, the shape of the material is displayed as a plane image indicating an area in correspondence with a machining allowance, in case that the material includes the portion to be machined which is formed by adding the specified machining allowance to the outline of the product. Therefore, a data input in relation to the shape of the material can be simplified, whereby the speedy machining simulation is enabled.

4 Claims, 6 Drawing Sheets

(a)

(b)

(c)

(d)

(a)

(b)

METHOD OF DISPLAYING SHAPES OF MATERIAL/PRODUCT IN MACHINING SIMULATION

BACKGROUND OF THE INVENTION

1. Field of the Invention

The present invention relates to a method of displaying a shape of a material and a shape of a product in a machining simulation, wherein the shape of the material, the shape of the product, and a shape of a tool are displayed as images on a display unit, wherein the displayed image of the tool is moved on the display unit on the basis of previously generated tool path data, wherein the image of the material and the image of the product which overlap the image of the tool are eliminated in order.

2. Description of the Prior Art

In an NC machine tool, a tool and a work piece are relatively moved and their movements are controlled on the basis of a previously generated machining program, while it is necessary that the machining program should be previously checked whether or not it has an error in case that a machining is performed for the first time on the basis of the machining program.

Usually, a machining simulation has been well known as an effective method for a pre-check. The machining simulation is executed by displaying a shape of a material, a shape of a product, and a shape of a tool on such as a display unit that is installed as an additional device of a numerical controller, and by moving the displayed image of the tool on the display unit on the basis of previously generated tool path data, also by eliminating the image of the material and the image of the product which overlap the image of the tool in order. Thus, a track of the tool can be identified, also a positional relationship between the tool and the material can be identified, whereby it is possible to previously check whether or not the machining program was correctly generated.

For displaying the shape of the material and (or) the shape of the product on the display unit, dimensions of all portions thereof such as an outer diameter, an inner diameter, and (or) a position of an end face have been usually inputted into a machining simulation apparatus for defining the shape of the material and the shape of the product for the purpose of displaying them on the display unit.

By the way, there are several kinds of materials used for a machining, for example, a material of a comparatively simple shape such as a cylindrical shape or a column shape, a molding material which has such a shape that a uniform machining allowance is added to the shape of the product through a forging and (or) a precision casting, and (or) a composite material which has a portion with the uniform machining allowance as well as a portion with a uniformly varying machining allowance. Further, there are some which include portions not to be machined in the molding material as well as in the composite material. In the molding material and the composite material, the portion with the uniform machining allowance can be defined in its shape such that the machining allowance is added to the shape of the product.

However, in the usual machining simulation, the shape of the material has been defined by inputting all dimensions of each part of the material as mentioned above, therefore it has taken a long time to input them in such a case that the shape of the material is very complicated, consequently a speedy simulation has not been enabled.

In case that the material include the portion not to be machined, the track of the tool doesn't pass therethrough, therefore it is usually unnecessary to display the shape of the product and the shape of the material with reference to the portion not to be machined when checking the machining program, however, in the usual machining simulation, dimensions of the portion not to be machined have been also inputted for displaying the whole shape. In this point, the speedy simulation has not been enabled, either.

In view of the foregoing, it is an object of the invention to provide a method of displaying the shape of the material and the shape of the product which enables a speedy machining simulation.

SUMMARY OF THE INVENTION

In accordance with the invention for achieving the above object, in a machining simulation which displays a shape of a material, a shape of a product, and a shape of a tool on a display unit, and moves a displayed image of the tool on the display unit on the basis of previously generated tool path data, and eliminates an image of the material and an image of the product overlapping the image of the tool in order, the machining simulation is characterized in that the shape of the product in accordance with a portion to be machined is displayed as a line image wherein only an outline of the product is illustrated on the basis of dimension data of the product, on the other hand, the shape of the material in accordance with the portion to be machined is displayed as a plane image which illustrates an area in correspondence with the machining allowance on the basis of machining allowance data in case that the material includes the portion to be machined which is formed by adding a specified machining allowance to the outline of the product.

As described above, in case that the material includes the portion to be machined formed by adding the uniform machining allowance to the outline of the product, that is, the material is a molding material or a composite material, the portion with the uniform machining allowance can be defined in its shape such that the machining allowance is added to the shape of the product. Therefore, when displaying the shape of the material and the shape of the product on the display unit, dimension data of each portion of the material isn't necessary to be inputted for defining the shape of the material, on the contrary, the shape of the material can be defined just by inputting only dimension data of the product and data of the machining allowance, as a result the shape of the material and the shape of the product can be displayed on the display unit only on the basis of those data.

In a method of display in accordance with the invention, in case that the material includes the portion to be machined which is formed by adding the specified machining allowance to the outline of the product, that is, the material is the molding material or the composite material, the shape of the product in accordance with the portion to be machined is displayed as the line image which illustrates only the outline of the product on the basis of dimension data of the product, while the shape of the material in accordance with the portion to be machined is displayed as the plane image which illustrates the area in correspondence with the machining allowance on the basis of data of the machining allowance through the input of only dimension data of the product and data of the machining allowance. Thus, a data input in relation to the shape of the material is simplified and a time taken for the data input is shortened, whereby a speedy machining simulation is enabled.

In addition, it is preferable that the plane image which illustrates the shape of the material is formed by outwardly off-setting the line image by the machining allowance for simplifying a displaying process, wherein the line image illustrates the shape of the product.

Further, it is also preferable that the shape of the product and the shape of the material in accordance with the portion not to be machined should not be displayed in case that the material includes the portion not to be machined for preventing unnecessary data input.

The line image showing the shape of the product may be displayed by a pixel group in correspondence with the outline of the product and by another pixel group which is inwardly arranged from the former pixel group at least by one pixel. In this case, the line image is illustrated with using a line of a thickness of two or more pixels.

As described above, in case that the material includes the portion to be machined which is formed by adding the specified machining allowance to the outline of the product, that is, the material is the molding material or the composite material, the shape of the product in accordance with the portion to be machined is displayed as the line image which illustrates only the outline of the product, on the other hand, the shape of the material is displayed as the plane image which illustrates the area in correspondence with the machining allowance. In this case, through an execution of the machining simulation, the image of the material and the image of the product which overlap the image of the tool are eliminated in order following after the movement of the image of the tool. Thus, whole the image of the material and the image of the product in accordance with the portion to be machined have been eliminated at a time when the machining simulation had been completed, whereby it cannot be possible to chase whether or not the tool had been moved correctly after the completion of the machining simulation.

However, above-mentioned problem can be removed by displaying the line image which illustrates the shape of the product with a line having a thickness of two or more pixels. That is, the line image is eliminated only by one pixel by the image of the tool which moves on the outline of the shape of the product, however, the remaining pixels are still displayed on the display unit as the line image illustrating the shape of the product, therefore it can be recognized whether or not the tool had been moved correctly even after the completion of the machining simulation. Thus, the problem as mentioned above which happens by simplifying the data input can be eliminated.

DETAILED DESCRIPTION OF THE INVENTION

Now, a specific embodiment of the invention will hereinbelow be described with reference to the accompanying drawings. Here, FIG. 1 is a block diagram showing rough components of a machining simulation apparatus in accordance with an embodiment of the invention.

Figure 1:
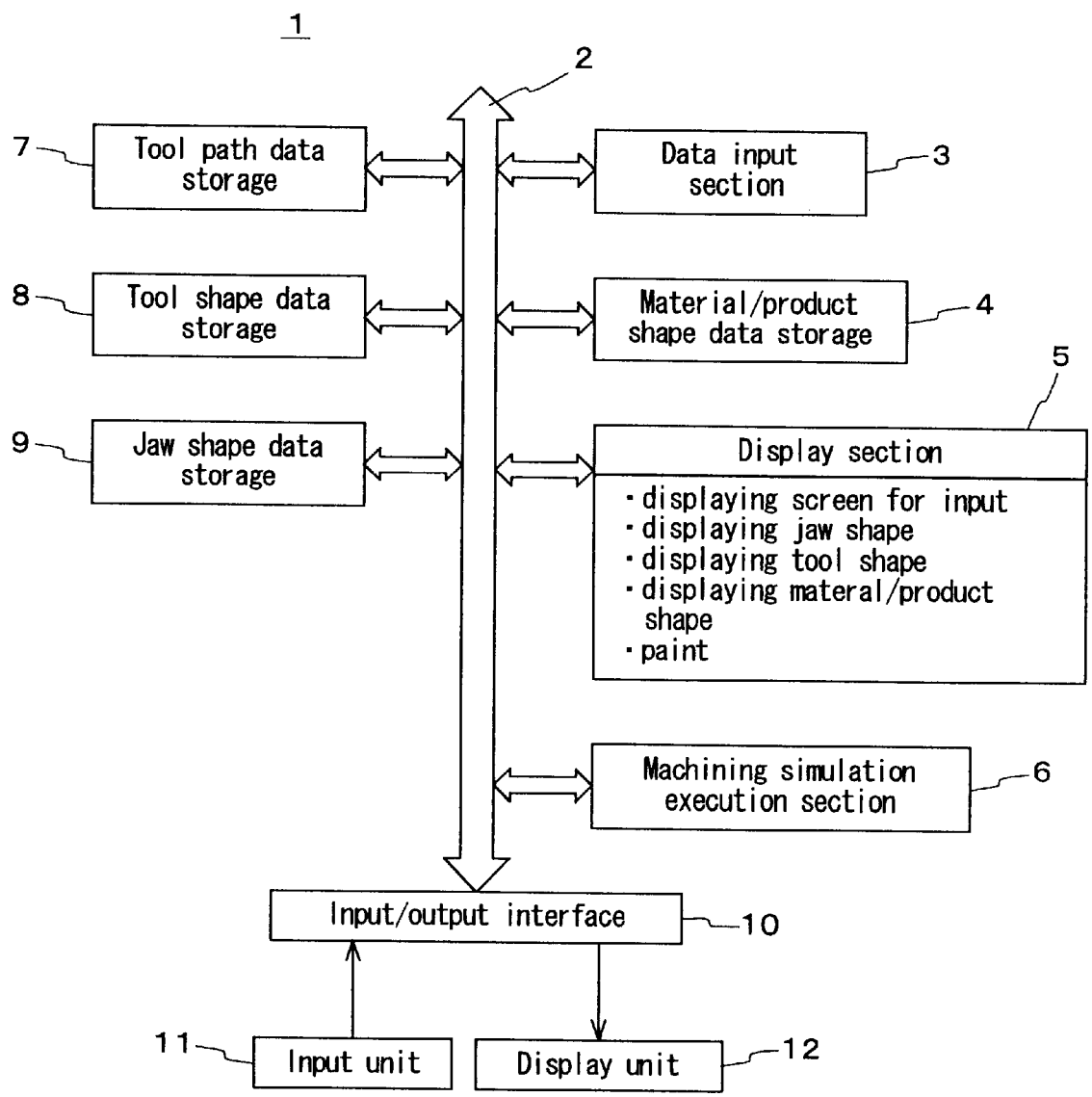
FIG. 1 is a block diagram showing rough components of a machining simulation apparatus in accordance with an embodiment of the invention.

As shown in FIG. 1, a machining simulation apparatus 1 of the embodiment comprises a data input section 3, a material/product shape data storage 4, a display section 5, a machining simulation execution section 6, a tool path data storage 7, a tool shape data storage 8, a jaw shape data storage 9, an input/output interface 10, and an input unit 11 and a display unit 12 both of which are connected to the input/output interface 10, wherein above-mentioned components are all connected with each other through a bus line 2.

The data input section 3 is a section into which tool path data, tool shape data, jaw shape data, and (or) material/product shape data which are all necessary to a machining simulation are inputted, wherein each data is inputted through a screen for input which is displayed on the display unit 12 by the display section 5 as well as through the input unit 11. Tool path data, tool shape data, jaw shape data, and material/product shape data which have been inputted are respectively stored in the tool path data storage 7, the tool shape data storage 8, the jaw shape data storage 9, and the material/product shape data storage 4.

Tool path data is composed of a tool number, position data of a tool which successively moves, and (or) data of moving speed of the tool. Tool shape data is composed of a kind of the tool and (or) dimension data of the tool. Jaw shape data is composed of a kind of a chuck jaw such as an inner jaw, an outer jaw, and a collet, and (or) dimension data thereof. Here, a detailed explanation about an inputting step of tool path data, tool shape data, and jaw shape data will be omitted.

Figure 2:
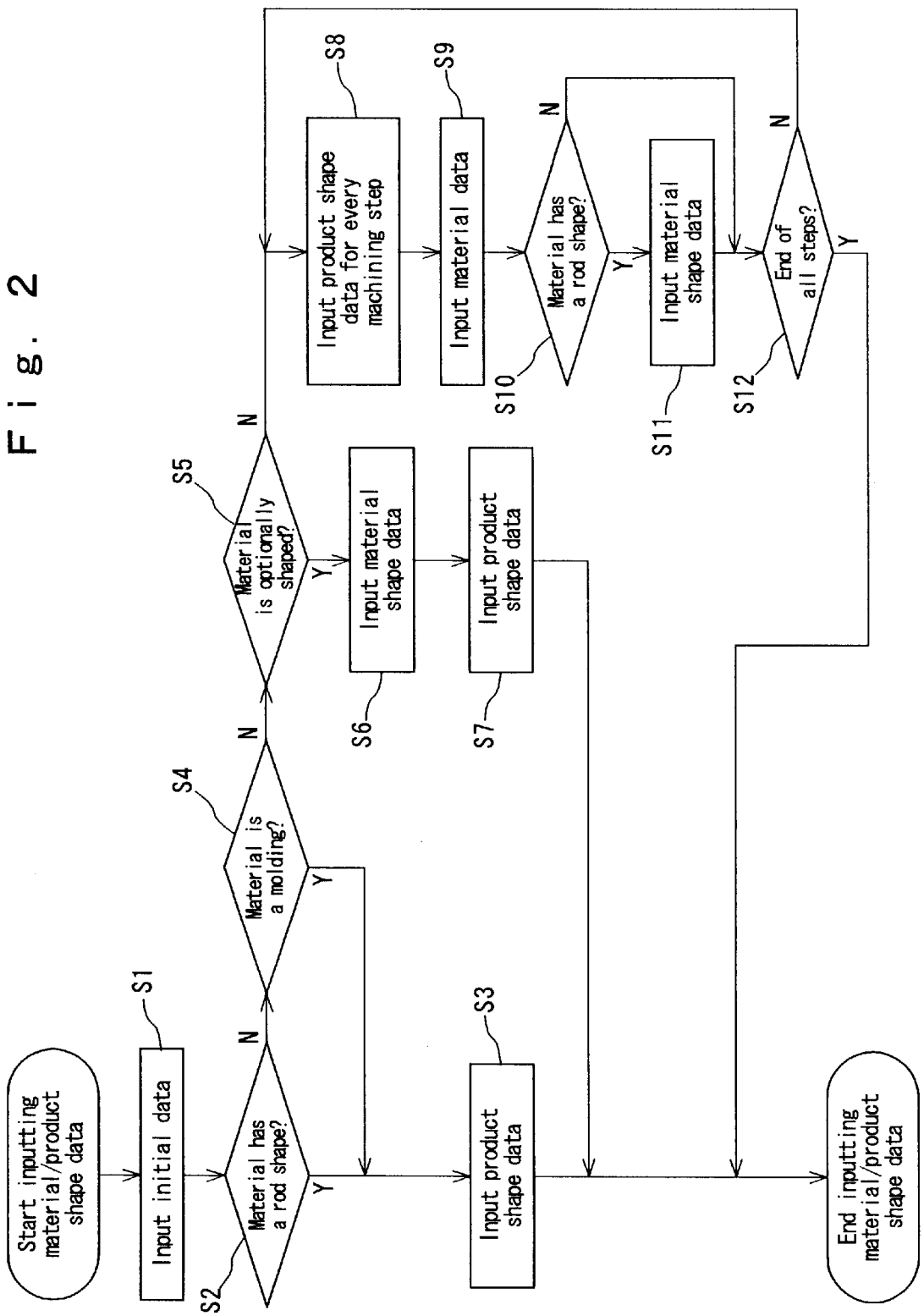
FIG. 2 is a flow chart showing an input step of data in relation to a shape of a material and a shape of a product in accordance with the embodiment.

In addition, material shape data composed of a kind of the shape of the material to be defined and (or) dimension data thereof and product shape data composed of dimension data of the product are inputted in accordance with a step shown in FIG. 2. That is, in step S1, firstly a plurality of initial data such as a dimension of the maximum outer diameter, a dimension of the minimum inner diameter, a length, a position of an end face, a machining allowance, and (or) a shape of the material to be defined are inputted. Here, in the embodiment, the material is classified in its shape into four groups. One is a rod shape material having a rectangular shape as seen from a front side thereof which is defined by data including the dimension of the outer diameter, the length, the position of the end face, and if necessary, the dimension of the inner diameter. Second is a molding material which is defined in its shape that a uniform machining allowance is added to the shape of the product. Third is a composite material which is defined in its shape such that a portion with a uniform machining allowance and a portion with a uniformly varying machining allowance are mixed therein. Fourth is an optionally shaped material which is defined by the dimension of the outer diameter, the dimension of the inner diameter, and the position of the end face of each portion of the material.

In case that the material is the rod shape material or the molding material (step S2, step S4), data in relation to the dimensions of the product such as the dimension of the outer diameter, the dimension of the inner diameter, and (or) the position of the end face is inputted (step S3). Here, only the dimensions in relation to a portion to be machined are inputted in step S3. In case that the material is the rod shape material, data in relation to the dimension of the maximum outer diameter, the dimension of the minimum inner diameter, the length, and the position of the end face inputted as initial data in step S1 is defined as dimension data in relation to the shape of the material.

On the other hand, in case that the shape of the material is the optionally shaped material (step S5), dimension data such as the dimension of the outer diameter, the dimension of the inner diameter, and (or) the position of the end face in relation to all portions of the material is successively inputted (step S6), next, dimension data such as the dimension of the outer diameter, the dimension of the inner diameter, and (or) the position of the end face in relation to all portions of the product is inputted (Step S7).

Further, in case that the material is not any of the rod shape material, the molding material, and the optionally shaped material, that is, it is the composite material (step S5), dimension data such as the dimension of the outer diameter, the dimension of the inner diameter, and (or) the position of the end face of the product is successively inputted for each machining step (step S8) Here, dimension data of the product inputted in step S8 also only relates to the portion to be machined. Next, difference in the shape of the material, that is, whether the material is the rod shape material or the molding material is inputted (step S9), wherein dimension data such as the dimension of the outer diameter, the dimension of the inner diameter, and (or) the position of the end face is inputted in case that the portion to be machined is the rod shape (step S10, step S11). After the input of above-mentioned dimension data, in case that the portion to be machined has a shape of the molding material, it is judged whether or not there is a next step. Then, in case that there is the next machining step, the steps after step S8 are repeated (step S12).

Thus, after dimension data in relation to the material as well as the product for each kind of the shape of the material has been inputted, all the input steps are ended, thereafter inputted shape data in relation to the material and the product is stored in the material/product shape data storage 4 as described above.

The display section 5 is a process section which displays a specified image on the display unit 12, also executing a jaw shape display for displaying an image of the chuck jaw on the basis of data stored in the jaw shape data storage 9, a tool shape display for displaying an image of the tool on the basis of data stored in the tool shape data storage 8, a material/product shape display for displaying images of the material and the product on the basis of data stored in the material/product shape data storage 4, and a paint of the images of the material and the product overlapping the image of the tool by the same color as that of a background.

The machining simulation execution section 6 is a process section which successively generates position data of the tool for every specified time on the basis of the tool number, position data of the tool which successively moves, and (or) data of moving speed of the tool stored in the tool path data storage 7. The display section 5 moves the image of the tool displayed on the display unit 12 in order on the basis of generated position data of the tool, for painting the image of the material and the image of the product overlapping the image of the tool in order by the same color as that of the background.

Figure 3:
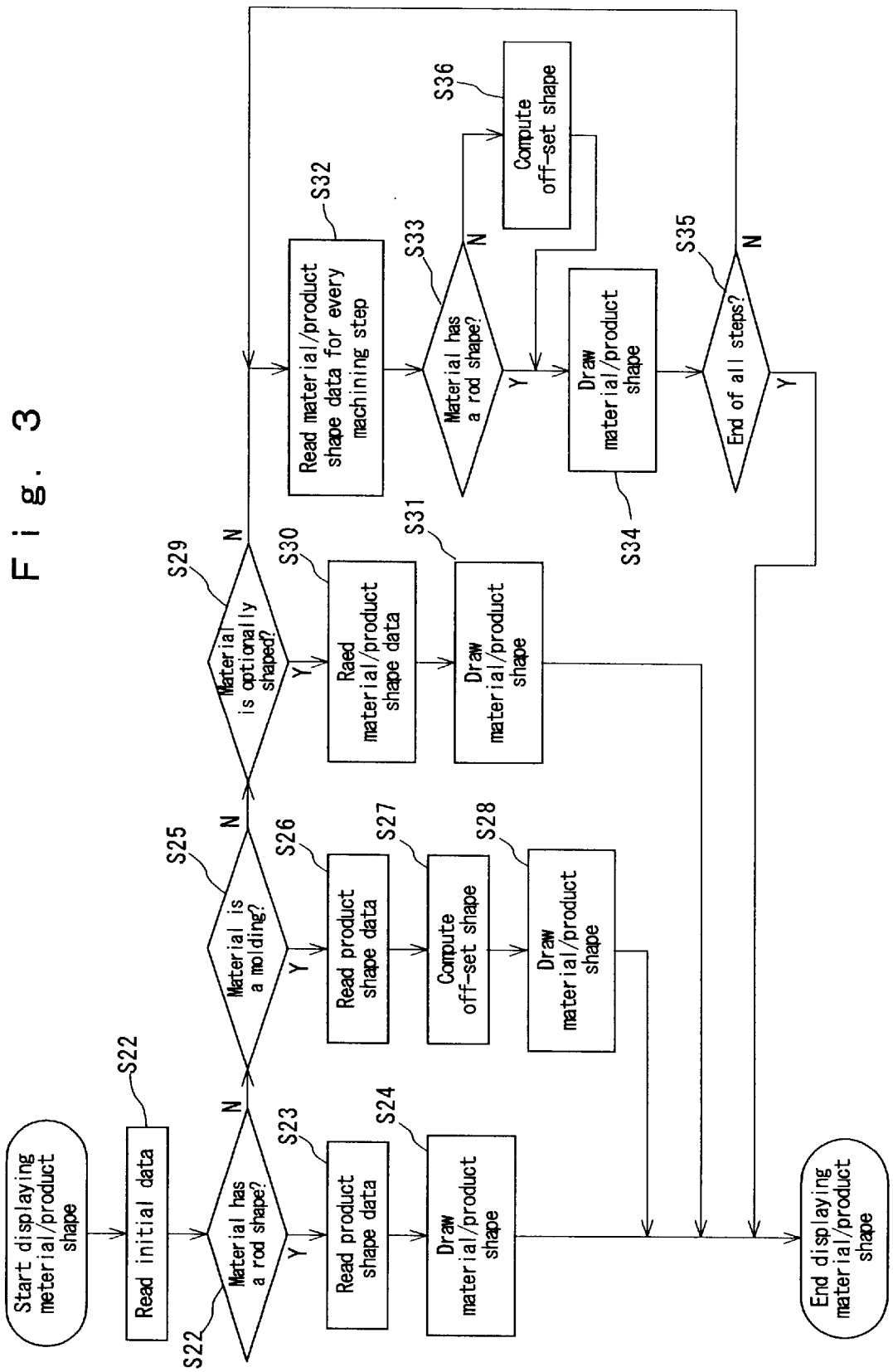
FIG. 3 is a flow chart showing a display step of the shape of the material and the shape of the product in accordance with the embodiment.

Now, a step for displaying the shape of the material and the shape of the product on the display unit 12 will herein-below be described more in detail with reference to the flow chart shown in FIG. 3. Firstly in step S21, initial data inputted as described above is read from the material/product shape data storage 4. Next, the kind of the shape of the material is discriminated (step S22, step S25, and step S29). In case that the material is the rod shape material, product shape data is further read from the material/product shape data storage 4 (step S23), thereafter the image of the material and the image of the product are displayed on the display unit 12 on the basis of material shape data included in product shape data and initial data which have been read, thereafter all steps are ended (step S24). An example of the image of the material and the image of the product displayed through the steps as described above is shown in FIG. 4a. As shown, an area with a hatching shows an image of a material B (a plane image), while a line image in the image of the material shows an image of a product A. Here, as to the image of the product A, only a portion to be machined is displayed.

Figure 4:
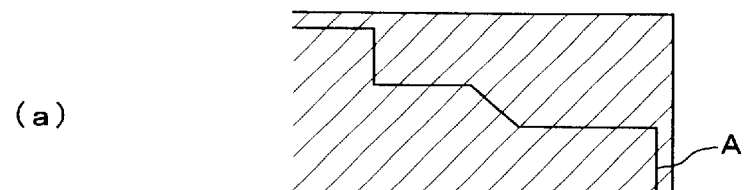
FIG. 4 is an explanation drawing explaining an example of a displayed image in accordance with a shape of each material.
Figure 4:
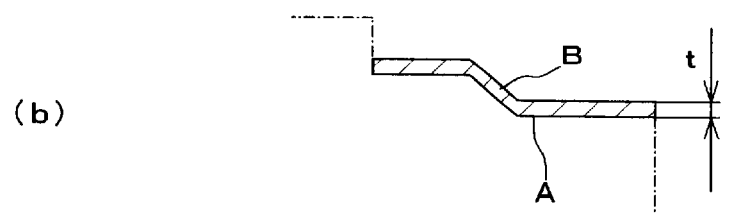
Figure 4:
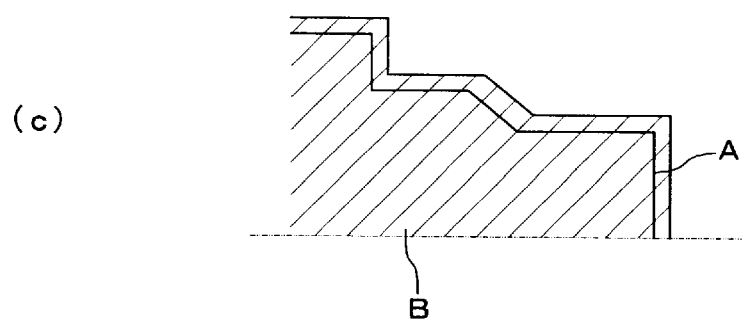
Figure 4:
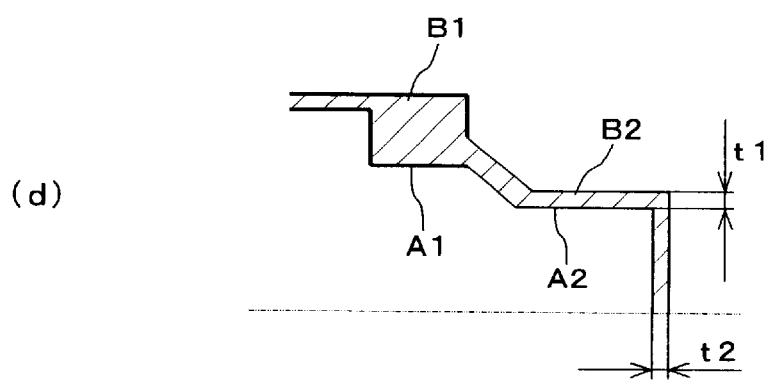

In case that the material is discriminated as the molding material in step S25, product shape data is read from the material/product shape data storage 4 (step S26), and shape data obtained by off-setting product shape data by the machining allowance outside of the product is computed on the basis of machining allowance data included in product shape data and initial data which have been read (step S27), thereafter the image of the product is displayed on the display unit 12 on the basis of product shape data, at the same time, an area between line images obtained from product shape data and shape data after the off-set is displayed on the display unit 12 as the image of the material, thereafter all steps are ended (step S28) An example of the image of the material and the image of the product displayed through the steps as mentioned above is shown in FIG. 4b. As shown, an area with a hatching is the image of the material B (the plane image), and a line image near a center line is the image of the product A. Here, only portions to be machined with relation to the image of the product A and the image of the material B are displayed. Alternate long and short dash lines in FIG. 4b show portions not to be machined, so they are not displayed on the display unit 12. An outline of the image of the material B is an image obtained by outwardly off-setting the image of the product A by a machining allowance t in a radial direction thereof.

In case that the material is discriminated as the optionally shaped material in step S29, next, product shape data and material shape data are read from the material/product shape data storage 4 (step S30), thereafter the image of the material and the image of the product are displayed on the display unit 12 on the basis of product shape data and material shape data which have been read, thus, all steps are ended (step S31). An example of the image of the material and the image of the product displayed as mentioned above is shown in FIG. 4c. As shown, an area with a hatching is the image of the material B (the plane image), on the other hand, a line image in the image of the material is the image of the product A.

Further, in case that the material is discriminated as the composite material in step S29, next, material shape data and product shape data in the first machining step are read from the material/product shape data storage 4 (step S32) so as to recognize whether or not the portion to be machined in the step is the rod shape (step S33). In case that the portion to be machined is the rod shape, the image of the material and the image of the product are displayed on the display unit 12 on the basis of product shape data and material shape data which have been read (step S34). On the other hand, in case that the portion to be machined in the step is recognized as the molding material, as in step S27, shape data obtained by off-setting product shape data by the machining allowance outside of the product is computed on the basis of machining allowance data included in product shape data and initial data which have been read (step S36), thereafter the image of the product is displayed on the display unit 12 on the basis of product shape data, at the same time, an area between the line images obtained from product shape data and shape data after the offset is displayed on the display unit 12 as the image of the material (step S34). Next, it is recognized whether or not there is a next step in step S35. In case that there is the next machining step, the steps after step S32 are repeated. On the other hand, in case that there isn't the next machining step, all steps are ended.

An example of the image of the material and the image of the product displayed through the steps as mentioned above is shown in FIG. 4d. As shown, areas with a hatching are the images of the material (the plane images) B1, B2. Line images near a center line are images of the product A1, A2. Here, as shown, the line image A1 illustrated with using a thick line and the image of the material B1 in accordance with an area whose outline is illustrated with using the thick line indicate the portions in relation to the rod shape. The line image A2 illustrated with using a secondary thick line and the image of the material B2 in accordance with an area whose outline is illustrated with using the secondary thick line indicate the portions in relation to the shape of the molding material. The lines of different thickness are used for discriminating the portion of the rod shape from the portion of the molding material. However, on the display unit 12, the images of the product A1 and A2 are subsequently illustrated as the line images with using the line of the same thickness, while the images of the material B1 and B2 are subsequently illustrated as the plane images wherein the outlines thereof are not displayed as the line images. Here, the outline of the image of the material B2 in relation to the shape of the molding material is displayed as an image obtained by outwardly off-setting the image of the product A2 by machining allowances t1, t2. In addition, only the portions to be machined in relation to the images of the product A1, A2, and images of the material B1, B2 are displayed.

Figure 5:
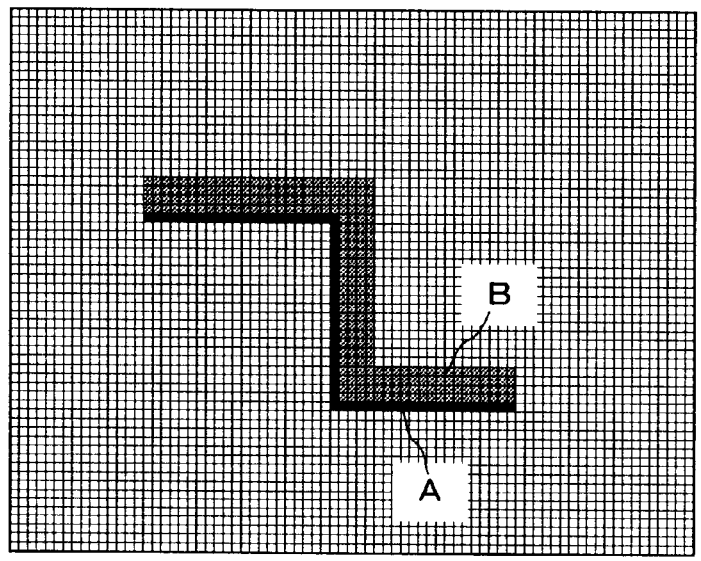
FIG. 5 is an explanation drawing explaining an example of a displayed image in case that the material is a molding material.
Figure 5:
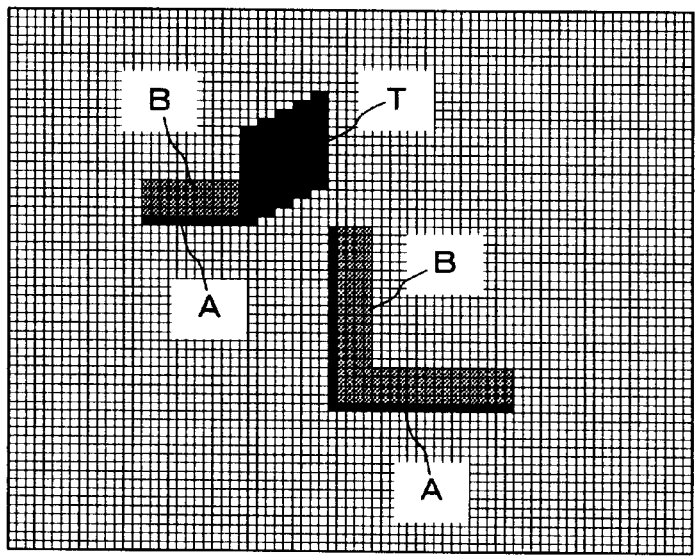

After the shape of the material and the shape of the product have been displayed on the display unit 12 as mentioned above, further the jaw shape and the shape of the tool have been displayed thereon, the machining simulation is executed by the machining simulation execution section 6. At that time, when position data of the tool is successively generated for every specified time, the display section 5 successively moves the image of the tool on the display unit 12 on the basis of generated position data of the tool, thereafter the image of the material and the image of the product which overlap the image of the tool are successively painted by the same color as that of the background. This is shown in FIG. 5. Here, FIG. 5a indicates the image of the product A and the image of the material B in case that the material is the molding material. The image of the product A is the line image having a thickness of one pixel. FIG. 5b indicates such a condition that the image of the material B and the image of the product A overlapping the image of the tool are painted by the color of the background following after the movement of the image of the tool T.

Figure 6:
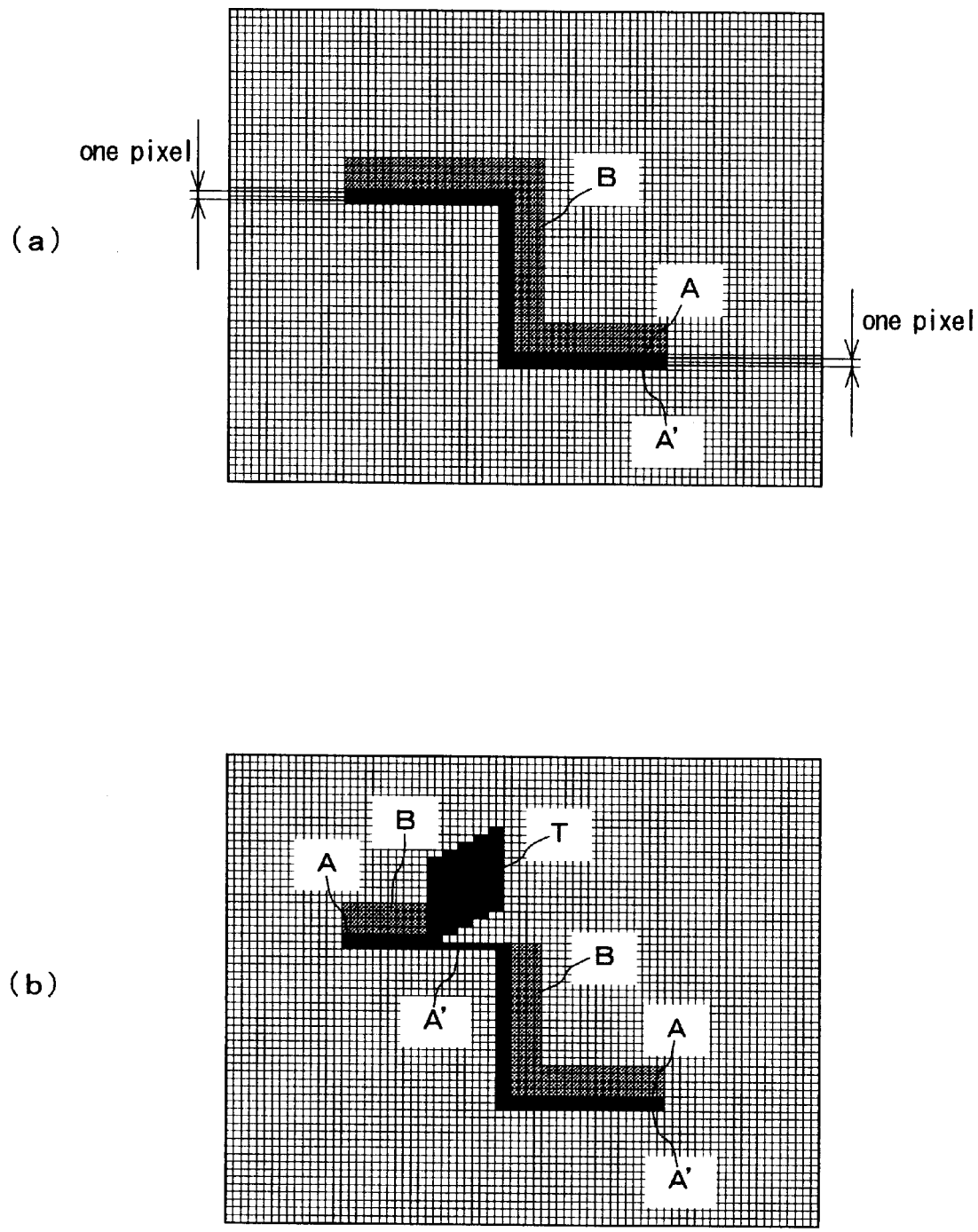
FIG. 6 is another explanation drawing explaining an example of a displayed image in case that the material is a molding material.

By the way, as shown in FIG. 5b, it cannot be recognized whether or not the tool had been moved correctly after the machining simulation had been completed, because the image of the product A and the image of the material B in accordance with the portions to be painted have been all eliminated through the painting step. Therefore, in case that it is necessary to identify a track of the tool after the machining simulation, the image of the product A is displayed with a thick line as shown in FIG. 6. That is, as shown in FIG. 6a, the line of the image of the product A can be made thicker by displaying another line image A' obtained by off-setting the original image of the product A by one pixel in the opposite direction of the image of the material B. A condition after the execution of the painting step following after the movement of the image of the tool T is shown in FIG. 6b. As shown, the line image A' indicating the product still remains even after the execution of the painting step because the thickness of the line of the image of the product is made thicker, therefore the track of the tool can be identified. Here, an amount of off-set in the off-set step is not limited to one pixel, but can be optionally set at one or more pixels.

As described above, in the machining simulation apparatus 1 in accordance with the embodiment, in case that the material includes the portion to be machined which is formed by adding the specified machining allowance to the outline of the product, that is, the material is the molding material or the composite material, the image of the product and the image of the material in accordance with the portion to be machined can be displayed only by inputting dimension data of the product and machining allowance data, wherein the image of the product and the image of the material are necessary to the machining simulation. Therefore, the inputting step of data in accordance with the shape of the material can be simplified compared with the usual machining simulation, that is, the speedy machining simulation is enabled. Further, since the shape of the product and the shape of the material in accordance with the portion not to be machined are not displayed, unnecessary data input can be prevented. In this point, the speedy machining simulation is also enabled.

While the invention has particularly shown and described with reference to preferred embodiments thereof, it will be understood that various modifications may be made therein.

What is claimed is:

1. In a machining simulation which displays a shape of a material, a shape of a product, and a shape of a tool as images on a display unit, comprising
    determining whether the material is a rod shape, molding, composite material and optional shape;
    computing a machine allowance when the material is a molding or composite material;
    moving the displayed image of the tool on the display unit on the basis of previously generated tool path data;
    eliminating portions of the image of the material and of the image of the product which overlap the image of the tool in order;
    displaying the shape of the product in accordance with a portion to be machined as a line image indicating only an outline of the product on the basis of dimension data of the product; and
    displaying the shape of the material in accordance with the portion to be machined as a plane image indicating an area in correspondence with a machining allowance on the basis of machining allowance data, in case that the material includes the portion to be machined which is formed by adding the specified machining allowance to the outline of the product.

2. The method of displaying the shape of the material and the shape of the product in the machining simulation as set forth in claim 1, wherein the plane image indicating the shape of the material is formed by outwardly off-setting the line image indicating the shape of the product by the machining allowance.

3. The method of displaying the shape of the material and the shape of the product in the machining simulation as set forth in claim 1, wherein the shape of the product and the shape of the material in accordance with portions not to be machined are not displayed in case that the material includes the portions not to be machined.

4. The method of displaying the shape of the material and the shape of the product in the machining simulation as set forth in either of claims 1, 2, and 3, wherein the line image indicating the shape of the product is displayed by a pixel group corresponding the outline of the product and another pixel group which is inwardly arranged from the former pixel group at least by one pixel.

* * * * *